March 8, 1949. R. A. NORBOM 2,464,183
PNEUMATICALLY UNLOADABLE SHIPPING CONTAINER
Filed July 30, 1943 6 Sheets-Sheet 1
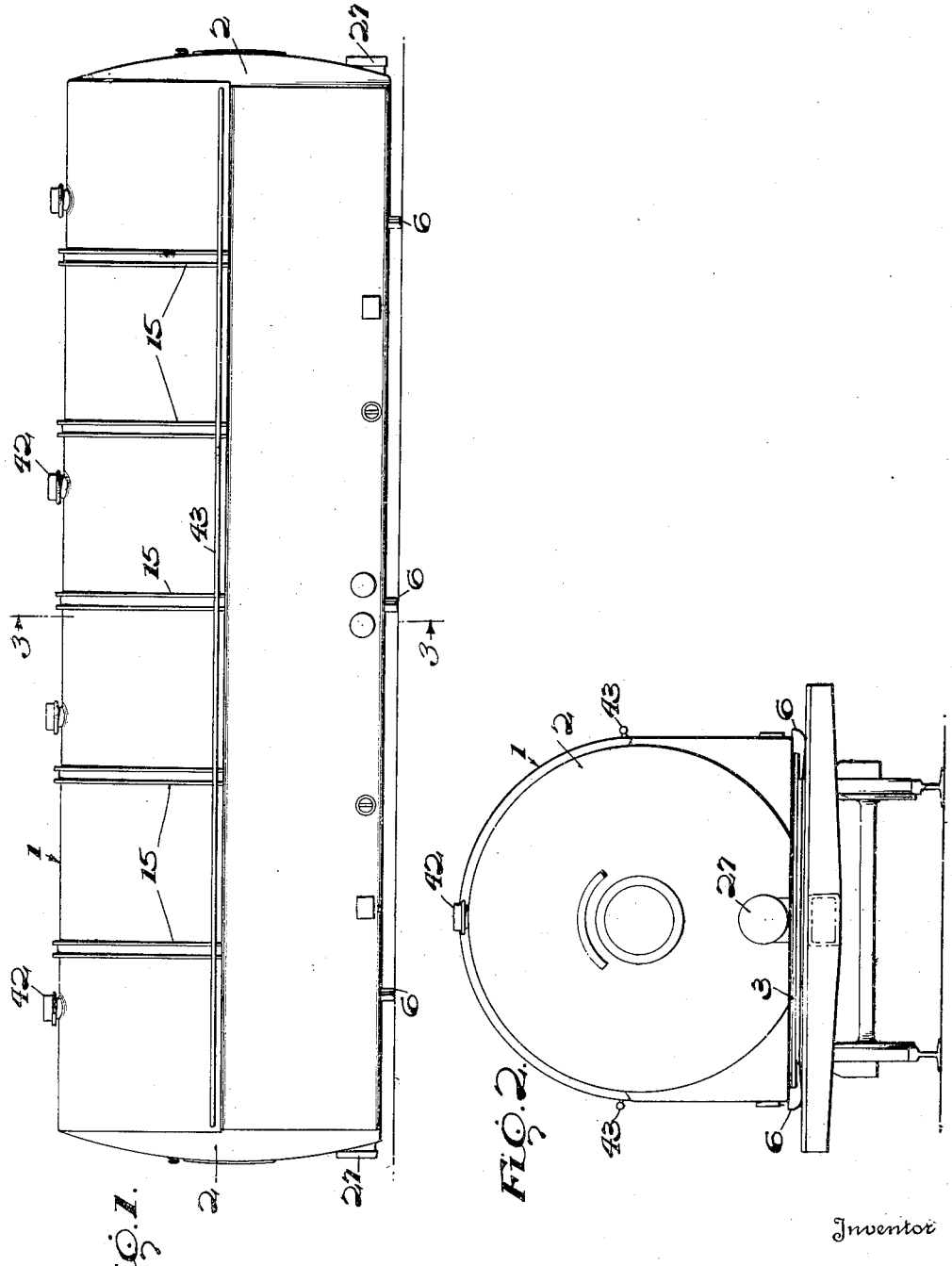
Inventor
Ragnar A. Norbom.
By Dyne & Kirchner
Attorneys

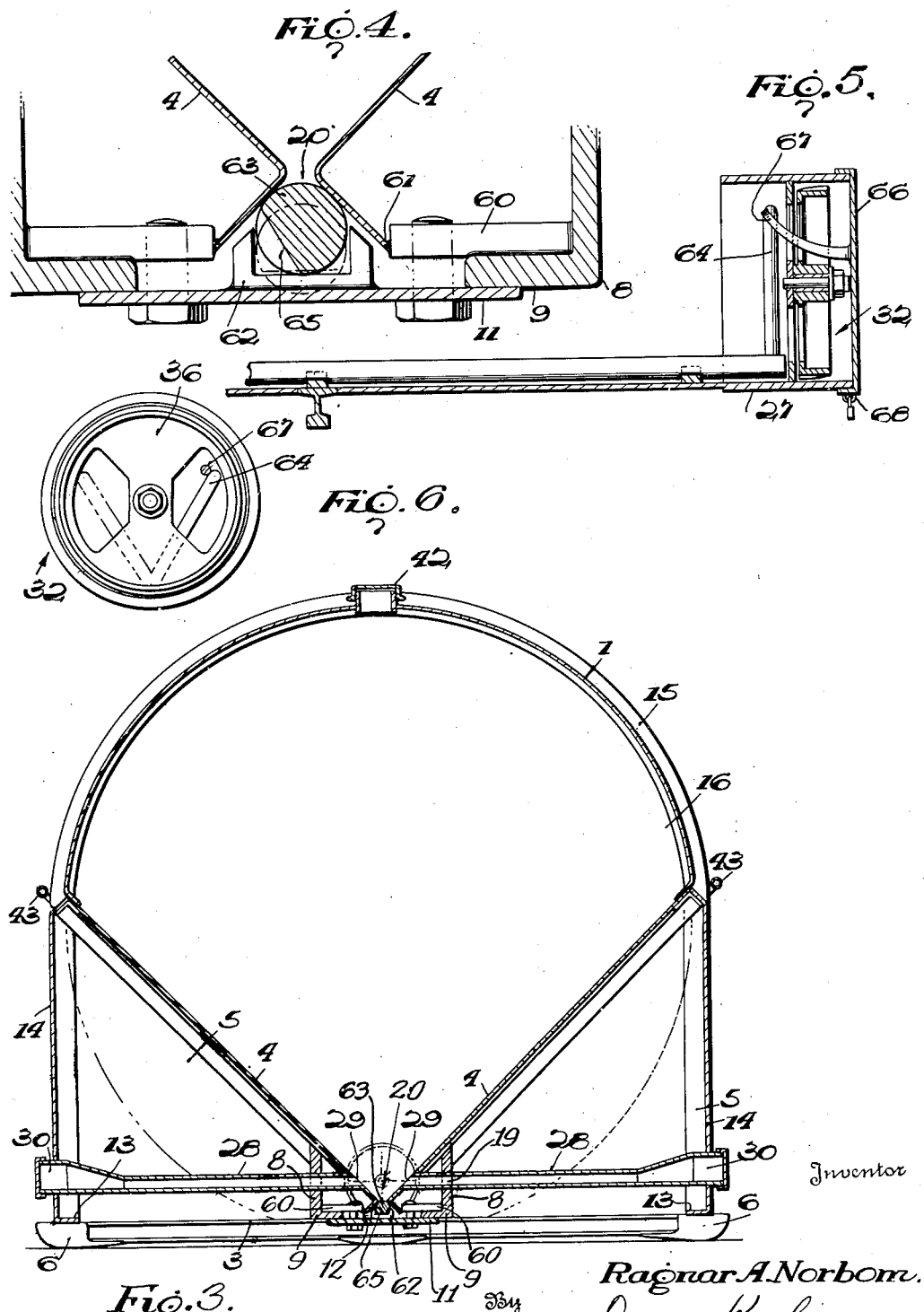

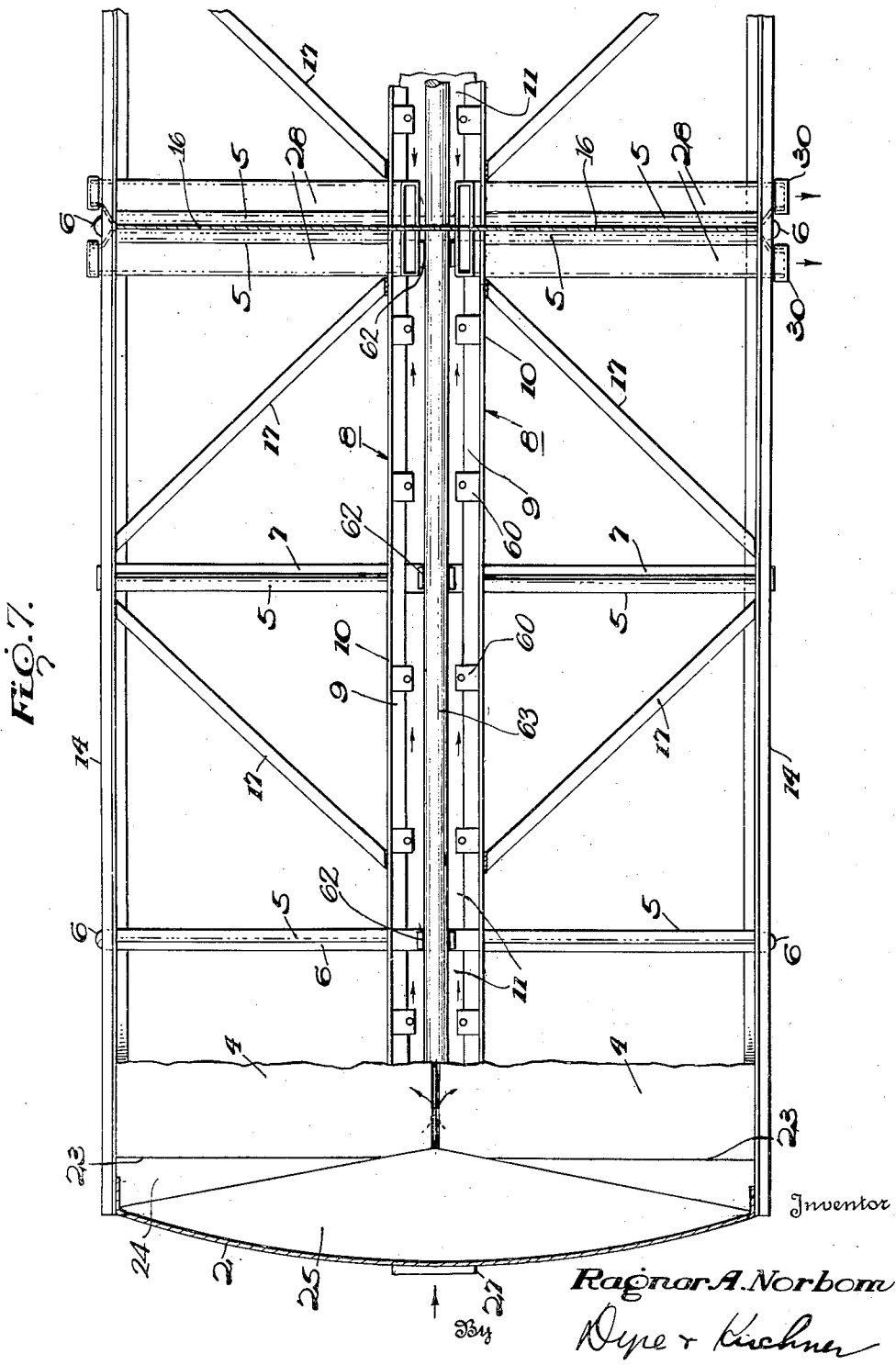

March 8, 1949. R. A. NORBOM 2,464,183
PNEUMATICALLY UNLOADABLE SHIPPING CONTAINER
Filed July 30, 1943 6 Sheets-Sheet 4
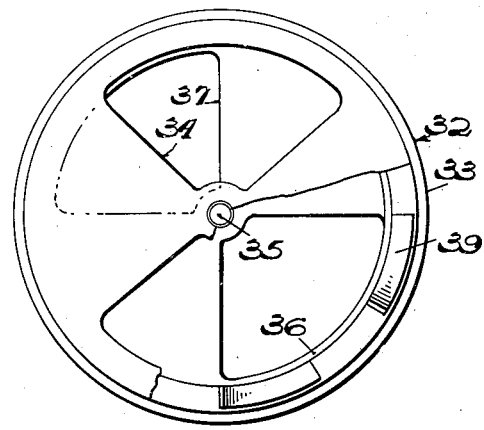
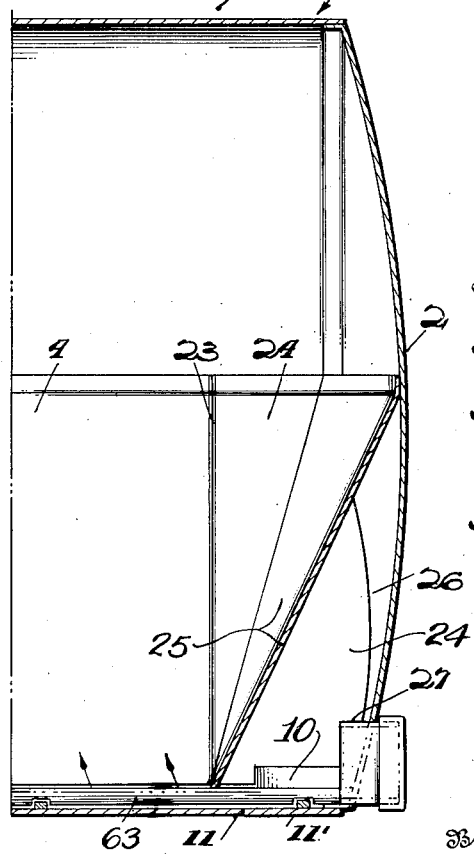
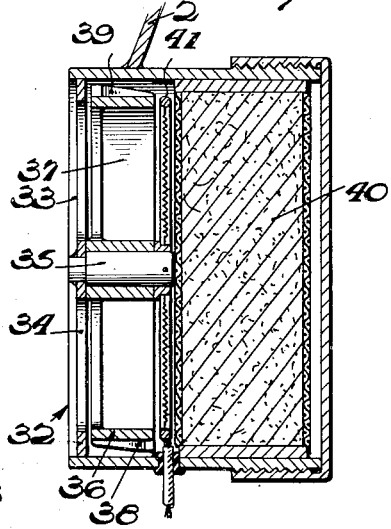
Inventor
Ragnar A. Norbom
By Dyne + Kirchner
Attorneys March 8, 1949.   R. A. NORBOM   2,464,183
PNEUMATICALLY UNLOADABLE SHIPPING CONTAINER
Filed July 30, 1943   6 Sheets-Sheet 5
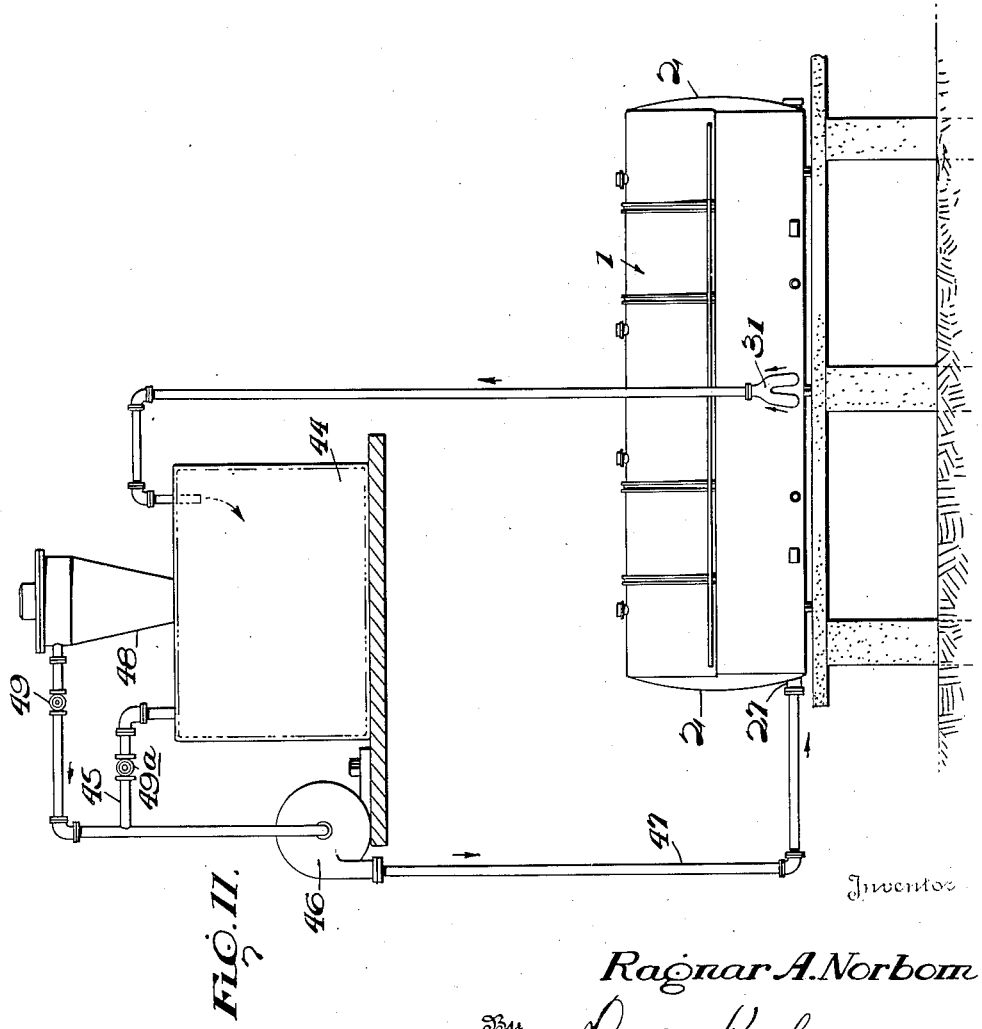

March 8, 1949.   R. A. NORBOM   2,464,183
PNEUMATICALLY UNLOADABLE SHIPPING CONTAINER
Filed July 30, 1943   6 Sheets-Sheet 6
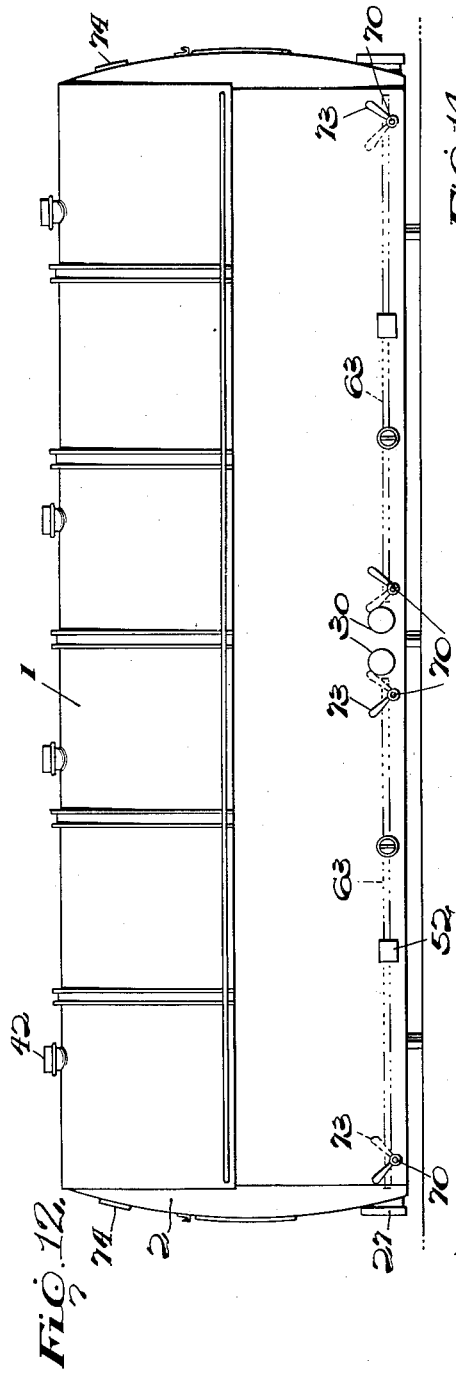
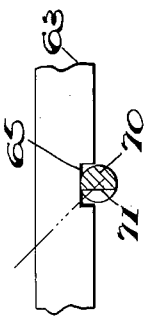
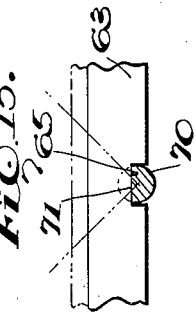
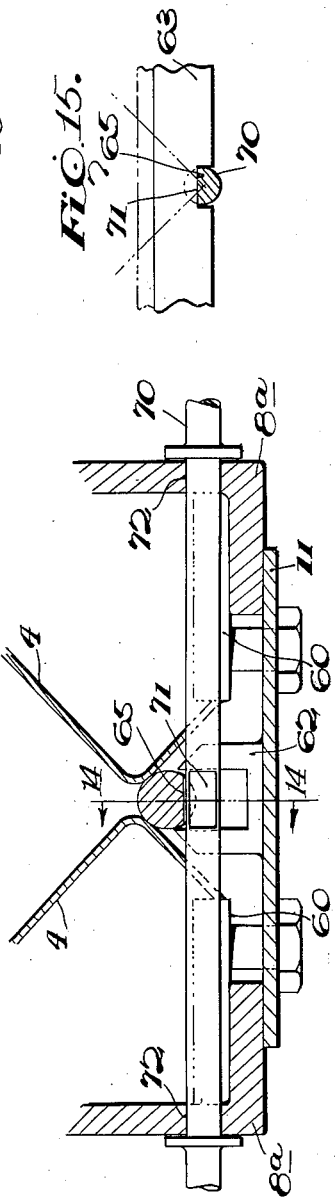
INVENTOR.
Ragnar A. Norbom
BY Dyne & Kirchner
ATTORNEYS.

Patented Mar. 8, 1949

2,464,183

UNITED STATES PATENT OFFICE 2,464,183

PNEUMATICALLY UNLOADABLE SHIPPING CONTAINER

Ragnar A. Norbom, New York, N. Y., assignor to National Fitch Corporation, a corporation of Delaware Application July 30, 1943, Serial No. 496,755

7 Claims. (Cl. 302—52)

This application is a continuation in part of my copending application Serial No. 427,202, filed January 17, 1942, and abandoned after the filing of this application. The invention relates to a transportation system and method and especially to a container useful therein and also independently thereof.

More particularly, it provides a method and apparatus for discharging from a container finely divided solids, such as cereal grains, salts, and flours, more efficiently than heretofore.

An object of this invention is broadly to improve the best prior devices and methods of handling bulk quantities of the above-described general classes of materials.

A further object is to extend the economies and other benefits of shipping and delivery continuously in bulk to certain industries that hitherto have been compelled to handle their materials in relatively small individual packages. The transportation of flour from within mill to within a distant bakery is a typical example.

Another object of this invention is to provide an improved large bulk container for finely divided material that is suitable for rail or highway transportation and adapted for complete and rapid evacuation of the contents by suction.

Another feature of the invention is that the rate of discharging the container may be kept constant, or be varied, or be interrupted, under the control of an operator who may take his position when and as desired at some bin or the like which is to be filled, or other place, remote from the container.

A more specific object of the invention is to insure evacuation of a container, even when the lading is such as wheat or other cereal flour that tends to cake or form a self-supporting arch over the outlet, and even though the container be horizontally elongated so that some material to be discharged must be moved between points at approximately the same level therein. This is accomplished by an air current so applied to the material that arches will be broken down and the material thereof will be swept out of the container. In the preferred embodiment of the invention this object is accomplished also by co-ordinating the air flow with certain specially designed parts of the container structure that the latter will be vibrated by the intermittent creation of a partial vacuum to dislodge material and cause it to move into the current for discharge from the container.

A further object is to equip a container of the character indicated with means for keeping the lading from sifting down into the air passageway in such quantities as might tend to clog the same and prevent or retard the starting of the exhausting operation. Two specific arrangements are illustrated herein for this purpose.

It is believed that those skilled in the art will readily understand the manifold main objects and advantages of the invention from the present disclosure of certain preferred embodiments and will realize that the principles of the invention may be diversely embodied in forms and subcombinations of method steps and structural relationships other than those here set forth by way of example. The present disclosure is made in accordance with the statute, but the principles of the invention transcend these merely illustrative embodiments and are to be measured by the scope of the appended claims, construed in the light of the prior art.

In the accompanying drawings, which form part of this application for letters patent, and in which the same reference character designates the same part in the several views, Figure 1 is a side elevational view of a container embodying the invention;

Fig. 2 is an end elevational view of such container, shown mounted on a railroad flat car;

Figure 3 is a transverse sectional view taken on line 3—3 of Figure 1.

Figure 4 is a detailed enlarged fragmentary view of the central lower portion of Figure 3.

Figure 5 is a detailed fragmentary longitudinal sectional view of the air inlet structure shown in the lower end portion of the container of Figure 1.

Figure 6 is an end elevational view of the structure construction illustrated in Figure 5 with certain parts removed to show details more clearly.

Figure 7 is a fragmentary horizontal sectional view of the container shown in Figure 1, with portions of the interior slope sheets broken away to show details more clearly.

Figure 8 is a fragmentary vertical longitudinal sectional view through one end of the container shown in Figure 1.

Figure 9 is an end elevational view on an enlarged scale of certain of the parts shown in Figure 5. Certain portions are broken away to show details more clearly.

Figure 10 is a fragmentary view on an enlarged scale corresponding to a portion of Figure 5, but modified by the addition of certain elements.

Figure 11 is a diagrammatic view of an installation for discharging the container shown in Figure 1.

Figure 12 is a side elevational view showing a modification of the container shown in Figure 1.

Figure 13 is a fragmentary sectional view corresponding to Figure 4 but showing the modified structure of the container illustrated in Figure 12.

Figure 14 is a detailed fragmentary view taken on line 14—14 of Figure 13 showing one position of the elements illustrated therein.

Figure 15 is a detailed fragmentary view corresponding to Figure 14 but showing another position of the elements.

These drawings show a form of container structure which provides essentially a lading chamber, an air duct extending continuously along the bottom of the container and arranged to receive air and supply the same to the chamber through a slot that is substantially as long as the chamber; and one or more outlets from the chamber through which this air, with lading entrained in it, may be discharged.

Referring to the drawings, 1 designates a shell, conveniently formed of shaped and fitted sheet metal plates, which constitutes the roof and merges into the side walls of a container. For the preferred purposes of a principal embodiment of the invention the overall diameter of the shell may be approximately eight feet and the structure, though preferably in shorter units appropriate to highway transportation, may be of any length that can be conveniently mounted on the underframe of a standard railroad car.

Conventional type dished heads 2 form the ends of the container and are fastened to the shell 1 as by welding. To obtain maximum capacity, and to effect a lowering of the center of gravity, the container may be designed so as to require these heads to be somewhat distorted from completely circular shape, i. e., their bottoms may be chords in the plane of the base of the container, rather than points on circles to which such plane would be tangent. Figure 2 shows the chord edge of a head at 3.

The bottom of the container is formed by a pair of slope sheets 4 which extend longitudinally through the structure and converge from near the juncture of the roof with the side walls of the shell 1, toward a vertex line extending along the lower portion of the bottom in substantially its median vertical plane. For a purpose hereinafter to be explained, these slope sheets are made of relatively light gauge metal, and they are supported by a series of vertical, generally right-triangular gussets 5 which are set edgewise at intervals along the structure. The gusset plates are flanged at their edges contacting the slope sheets, to which they may be fastened as by welding although the connection is preferably merely one of contact. The upright edge of each gusset extends from the edge of the shell 1 to the horizontal edge lying in a transverse plane below the vertex line toward which the slope sheets converge. The endmost gussets are welded to the heads 2.

A strong supporting underframe for the gussets, and hence for the slope sheets, is provided by a plurality (three in the embodiment shown in Fig. 1) of stout bars or beam-like members 6 which extend across the under part of the structure and constitute a series of intermediate sills. A gusset stands edgewise on each of these sills and is preferably welded to it. The sills may be specially formed, as by inverted railroad rail with center and end shoes, so as to function as skid rails, as disclosed in Patent No. 2,114,707, by which the container structure may be slid onto and off of stationary platforms, railway or highway vehicle beds, and the like, especially such as are provided with trackways to coact with the skid rails.

If the dimensions, proportions, or intended uses of the structure appear to require gusset plates in a number greater than the number of skid rails, which latter probably never need exceed three, additional sill members 7 (Figure 7) may be interposed between pairs of adjacent skid rails, and each such additional sill may support a flanged gusset and be welded to it. In the present example two additional sill members are shown. Each is a rigid element of some conventional structural shape and conveniently terminates in a socket adapted to receive a push-pull bar for effecting movement of the container between vehicles or between a vehicle and a platform or the like. Of course the additional sill members are arranged symmetrically of the whole structure in order to enhance their bracing effect, as well as to distribute evenly the pushing or pulling forces.

Seated on the series of skid rails, and the additional sill members, and extending from end to end of the structure (unless partitioned as hereinafter described), are a pair of spaced angle bars 8. The horizontal leg 9 of each angle bar is welded to the skid rails and sill members where it crosses them. The two vertical legs 10 of the angle bars are spaced equally on opposite sides of the vertex line toward which the slope sheets 4 converge. The upper edges of these legs are welded to the slope sheets near the lower edges of the slope sheets. The spaces along the angle bars 8, between skid rails and sill members 7, are closed by plates 11 which are removably bolted to inwardly projecting blocks 60 which are welded at spaced intervals to the upper side of the legs 9 of the angle bars. In this way a trough or duct 12 (Figure 3) is provided along the central bottom of the container, beneath the slope sheets. At the ends of the structure, I provide fixed transverse plates 11' (Figure 8), which serve as end sills and as bottom plates for the trough.

The inner edges of the gusset plates 5 abut the leg 9 of the adjacent angle bar 8, and are notched at the outer edge of each to receive the inturned flange 13 of skirting 14 which extends along the lower zone of the sides of the structure, from the sills up to the bottom edges of the shell 1, being welded to the edges of the gussets, enclosing the spaces between them and providing a smooth exterior for the structure.

The container may be additionally strengthened by arched channel iron members 15 welded around it. Any desired number of transverse partition walls or bulkheads, like the single central one shown at 16 (Figure 7), may be employed not only to divide the container into compartments, but also to add strength and rigidity to the structure. Moreover, diagonal horizontal braces 17 may be extended from the angle bars 8 to the sides of the structure, being welded at their inner ends to the angle bars 8 and at their outer ends to the flanges 13 of the skirting 14.

It will be appreciated that the combination of skid rails 6, sills 7, flanges 13 (which act as side sills), angle bars 8 (which act as center sills), end sills 11', and braces 17, comprises a rigid underframe which, principally through the medium of the gussets 5, provides strong support for the container per se. While the structural relationships embodied in this particular underframe are highly useful and, I believe, inventively novel, it is to be understood that they may be altered considerably without deviating from those principles of the invention which are concerned with providing a method and means for containing a bulk lading of the class described hereinabove and discharging the same.

The slope sheets 4 do not quite meet at their bottom edges, but each is flanged outwardly and downwardly at 19 and the vertexes which these flanges form with the bodies of the sheets are spaced slightly apart to provide a comparatively narrow slot 20. The lower edges of the flanges 19 are welded to the blocks 60, as at 61 (Figure 4) to support and maintain the lower portions of the slope sheets 4 in position to define the slot 20.

It will be remembered that a feature of the invention resides in the use of a duct for admitting air through a lengthwise slot in the bottom of the container. The trough 12 included between the angle bars 8 and plate 11 constitutes such a duct in the example here illustrated. Since all the air that passes through the container to entrain the lading for discharge should enter the container through the slot, and should be supplied first to the trough from which it can pass through any part of the slot to attack and remove the lading, and since it is desired to extend the container into the extreme ends of the structure to make the capacity as great as possible, a special type of construction is provided at each end, as will now be described.

Each of the angle bars 8 extends continuously from end to end of the container, or from an intermediate transverse partition 16 to an end. At its outer end each angle bar 8 has its legs cut along appropriate curves which fit and are welded to the dished head 2. The endmost bottom plate 11 abuts the end sill 11', which is welded to the head 2, as shown in Fig. 8. The slope sheets 4 could be extended into similar engagement with the head, but it is more convenient to have them terminate in right angular edges 23 somewhat short of the head and to employ a supplementary sheet 24 to bridge the space between each edge 23 and the head, to which they are fitted and welded. Their lower edges are welded to the upper edges of the angles 8 and the sheets 24 are joined, as by lap welding, to the slope sheets 4.

An end slope sheet 25 covers the pocket 26 which is defined by the lower zone of the head 2, the supplementary sheets 24, the vertical legs 10 of the angles 8, and the end sill 11'. This end slope sheet is flanged along its upper edge, which is curved to fit and is welded to the head 2 and its sides converge to fit in between the supplementary sheets 24, to which they are welded. These converging sides meet at what is substantially a point in the slot 20. The lower edges of the slope sheets 24 terminate at the upper edges of the angles 8 for an extended length within the pocket 26 to provide ready access for air to the trough 12, as will be described.

A short nipple 27 penetrates each head 2 and extends slightly into the pocket 26. It will be evident that if this nipple is open, air may enter through it, into the pocket 26 and thence into the trough 12 and through the slot 20 into the container.

An outlet conduit 28 opens at 29 through one of the slope sheets 4 at the end of the container compartment remote from the inlet nipple 27 and extends through an opening in the skirting 14 as a short nipple 30 projecting therefrom. In the illustrative embodiment the container is divided into two compartments by the partition or bulkhead 16; hence a pair of outlet conduits 28 are provided, one on each side of the partition, each pair serving one of the two compartments. Each outlet conduit opens into its compartment slightly above the slot 20. As shown in Figure 7, the main length of each outlet conduit is of oblong cross section, while the projecting nipple 30 is circular. The two nipples may be separate elements, or they may be merged together. I prefer to make them separate in order that lading may be discharged through one of them from its compartment without disturbing the lading in the adjacent compartment. Obviously in such case both compartments may be discharged simultaneously by the use of Y-shaped adapter 31, shown in Fig. 11, having a leg connectable to each nipple and merging into a common outlet.

The protruding parts of the inlet and outlet nipples are made short so as not to project much beyond the adjacent areas of the structure's exterior and are threaded to receive caps which are kept on the nipples until the lading is to be discharged. It will be obvious that if the caps are removed and a suction hose is coupled to the outlet nipple 30, material will be pneumatically withdrawn from the container and will be replaced by air entering through the passageway formed by pocket 26, trough 12, and slot 20. Material becomes entrained in the air stream entering the container through the slot 20. Inasmuch as air enters the container throughout the length of the slot 20, material is removed from the container throughout its whole length. Lading of some types and conditions will fall readily toward the slot to be removed by the air stream, but other lading, under some conditions, tends to become compacted and arch over the slot 20 or the opening 29. A further difficulty is presented by the fact that, to give the container maximum capacity, the slope sheets 4 are set at an angle which is considerably less steep than the angle of repose for some materials which will be handled. Consequently there will be a tendency for material to rest on the slope sheets while the passageway along which the air travels remains quite free of material.

I have provided novel means to dislodge and discharge material that tends to arch above the slot or opening or rest on the slope sheets. This means comprises essentially a device for periodically interrupting the flow of air through the passageway. While such a device may assume any of a number of appropriate forms, I prefer to employ one of the type illustrated in the present disclosure. It consists of a rotary valve conveniently contained in the inlet nipple 27, shown particularly in Figs. 5, 6, 9 and 10.

The valve, designated generally 32, comprises a stator plate 33 welded in the inlet nipple and having an opening 34, or a plurality of such openings. The center of the plate mounts a stub shaft 35 on which is journaled the hub of a rotor 36 which includes a plate having ports 37 corresponding to the openings 34 an a cylindrical periphery 38 which carries a plurality of outwardly radiating helical fins 39. These fins are spaced slightly from the inner wall of the nipple 27 which encases the valve, and there is a slight space between the stator plate and the rotor. As will be understood, air passing through the valve will act on the fins 39 to turn the rotor so as intermittently to bring the ports of the two members into and out of register. Constant flow of air through the space between the rotor and stator makes the rotor self-starting, regardless of the position in which it may have come to rest. Rotation of the rotor operates to interrupt rapidly and periodically the flow of air into the pocket 26 and through the air passageway that has been described. Since the suction applied to the outlet nipple 30 is substantially constant, the interruptions at the inlet cause pulsations of the air and fluctuations of its pressure in the container. Pressure above the material within the container remains substantially constant, and these fluctuations of pressure or current beneath it tend to shake or blow material arched above the slot 20 and cause it to collapse into the air stream to be picked up by and discharged with it.

The fluctuating pressure produces another very important result. Since the slope sheets 4, on which material may be resting, have their bottom surfaces exposed to atmospheric pressure, and their top surfaces exposed to fluctuations in pressure, there is a tendency for these sheets to vibrate. As heretofore stated, the sheets are made of relatively light gauge metal, and they span considerable spaces, between gusset plates 5, where they are devoid of immediate support. It will be recalled that they may, if found necessary, be arranged to merely rest on the gusset plates without any positive connection thereto. The object is to render these plates capable of vibration under the differential air pressures above and below them, so that they may act as diaphragms. In actual operation they shake at sufficient frequency and through a great enough amplitude to dislodge material from them so that it may slide by gravity down to the slot 20.

The air inlet nipple 27 may optionally encase such instrumentalities as a filter 40, a hot plate 41, both of which are shown in Fig. 10, and any other desired means for conditioning the air that is to be admitted to the container. Of course these and other devices might be located anywhere else in the system anterior to the regions where their effects are desired. For the handling of wheat flour and certain salts, particularly those which are more or less hygroscopic, a dehumidifier may be included in the system for appropriately conditioning the air, prior to its introduction into the container, to prevent impairment of its entraining capacity.

It is convenient to provide discharge conduits 28 at both sides of the structure so that the lading may be discharged optionally from either side. Of course the outlet or outlets that are not being used during any given discharging operation are kept capped.

Any convenient number of filling openings or manholes 42 may be provided in the roof of the container and equipped with appropriate closures for sealing the openings substantially hermetically. Such adjuncts as a hand rail 43 may be employed for the convenience of trainmen or other operators.

To prevent undesired shifting of the container on the supporting vehicle in transit, any suitable blocking means may be used.

It is contemplated that in use any suitable suction device will be incorporated in a discharge hose connected to the outlet 30. Since the lading is entrained in the air which is sucked through this discharge hose, there is no practical limit to the distance or elevation to which it may be carried. Thus for example the lading may be conducted from a container near the ground to an upper story of a building. In a typical arrangement for discharging, shown diagrammatically in Fig. 11, a hose or other suitable conduit is coupled to the outlet nipple 30, or to an adapter 31 if several compartments are to be discharged simultaneously, and delivers its air and entrained material to a bin 44. Most, if not all, of the material will settle out of the air in the bin, and the air will be passed off through a flue 45. A pump 46 connected to this flue produces the suction current through the container passageway and the delivery system. Air exhausted from the pump may be discharged to atmosphere, or it may be recycled through the container by a hose 47 connected to the container inlet nipple 27. If desired, air passing from the bin to the pump may be run through a separator 48 suitable for extracting from it any residual fine dust. Valves 49 and 49a in the air lines from the separator and bin permit the separator to be by-passed when desired.

In order to obstruct the sifting of objectionable quantities of the rather fluent lading material through the slot 20 into the air duct 12, means are provided to close the slot when suction evacuation is not being effected. Referring now to Figures 3 to 7, at intervals along the trough, say about every four feet, there is welded to the bottom thereof a guide block 62 in the form of an upwardly opening U-shaped element or short length of channel iron. In this series of guide blocks is seated a rod member 63 which extends the full length of the slot 20 and projects into air inlet nipple 27, as indicated in Fig. 5, where it is provided with a radially extending handle 64 by which the rod member may be manually rotated some 60°.

The rod member is so formed as to rise or fall vertically in the guide blocks when rotated in one direction or the other, so as to provide in its elevated position a good closure for the slot, and to clear and open the slot when lowered. A convenient arrangement for accomplishing this purpose consists in segmentally notching the bar member as shown at 65, at the region of each guide block, and so proportioning the parts that when the handle 64 is at one limit of its range of movement the floor of each notch 65 will seat in the bottom a guide block so that the bar member will be lowered from the slot, and when the handle is moved to its opposite limit a round portion of the bar member surface will seat in the bottom of each guide block to elevate the bar member into closing relation to the slot, as indicated by the full and dotted lines in Fig. 4. The rod member is thus cammed up into slot-closing position and it is only necessary to hold it there to keep the slot closed.

The bar member may be locked in closing position by providing the air inlet nipple cap, shown at 66 in Fig. 5, with an inwardly extending finger 67 which, when the cap is mounted on the nipple in proper relation thereto to permit the hasp 68 to be closed, will penetrate the openings in the valve 32 and engage the handle 64 and hold it against movement to the slot-opening position, shown in broken lines in Fig. 6.

The filter 40 and heater 41 of Fig. 14 are not shown in Fig. 5 but if desired they may be mounted inwardly of the valve 32 and handle 64 so as not to interfere with entry of the locking finger 67.

I have found that under some circumstances it is advantageous to direct the evacuating current of air more forcily through some particular portion of the slot 20, such as a portion under a more densely compacted part of the lading, or a portion underlying the outer end zones of the compartment which are farthest from the outlet 29. Closure bar means for controlling the effective width of the slot along different portions of its length for such purpose may be provided by a slight modification of the arrangement shown in Figs. 3 to 7. This construction is shown in Figs. 12 to 15 and comprises mounting transverse closure bar control rods 70, one under each end portion of the closure bar 63, each of which is notched at 71 to cooperate with a notch 65 in the closure bar and is independently axially rotatable to cam the closure bar up or down at either end. The closure bar in this case is not rotatable. The control rods may be journaled in openings 72 formed in the vertical flanges of the angle bars 8 and project to one or both sides of the container where they are provided with hand wheels, levers, or the like 73 for turning them between limits indicated by the full and dotted line showings in Figure 12. The two limits of rotation of each control rod are shown respectively in Figures 14 and 15. Both such control rods may be turned to elevate the closure bar bodily all along its length to close the slot, or one or the other of them may be turned to open the slot to a maximum at one end and provide an effective slot opening which becomes progressively more reduced toward its opposite end. With the closure bar thus inclined in one direction or the other, incoming air passes with greater velocity through the narrower slot width and more forcibly attacks the lading at such points. Peep holes 74 (Figure 12) may be appropriately located in the container walls so that an operator may observe the progress of the evacuation and may operate the control rods accordingly.

It will be appreciated from the foregoing disclosure that the particular structure in which I prefer to embody the new means, and by which I prefer to practice the new method, presents some features of considerable practical utility. Except for the valve rotor, there is no moving part. The trough bottom plates 11 are easily removed for cleaning whenever necessary. The effective size of the slot opening 20 can be adjusted by the simple expedient of rotating the bar 63 in the arrangement shown in Figs. 3 to 7, or in the modified form hereinabove just described, closure bars 63 with varying sized segmental notches 65 may be employed selectively to vary the effective size of the slot opening 20 and hence the velocity of the current therethrough.

The structure is devoid of projecting parts, excepting only the nipples 27 and 30, and these may easily be proportioned so as to extend beyond the adjacent exterior walls no more than a few inches, or just enough to present sufficient threaded or plain surface to receive a cap or a hose coupling. Hence no part is vulnerable to damage, even from abnormally rough handling. The nipples are best made short enough to terminate within the overall clearances established by the hand rails 43 and the ends of the skid rails 6 and by the center bulges of the end heads 2. Thus a plurality of containers may be abutted end to end on the underframe of a railroad car, or side to side on a platform, with no danger of injury to the nipples. Substantially all the parts are common structural shapes, such as plates, angles, channels, etc., and the connections are for the most part effected by such ordinary expedients as welding, bolting, etc., so that the cost of fabricating the structure may be kept very low. No part is subjected to any great amount of wear in use, and none should require replacement during the life of the structure as a whole.

The container may be filled by gravity in the usual way or from a bin embodying my invention and the operation of discharging it may be easily accomplished without any special equipment except a simple suction device. The discharging operation proceeds automatically and continuously as long as the suction device is operated. Whereas other conduit discharge systems normally require constant attention by an operator at the delivery end, it will be evident that the present system substantially eliminates such attention, since the amount, time and rate of discharge may be fixed initially, or changed if and when desired, by manipulating any suitable type of switch or other control of an electric or other motor driving the suction, or, by any other device such as a damper, regulating the volume or capacity of the conduit; otherwise the present system may be left, and will operate, wholly unattached.

Other structural and operating advantages of the device and system will, it is thought, be recognized and appreciated by those skilled in the art.

I claim:

1. Apparatus for bulk transportation of finely divided solid material such as cereal flour or the like, the combination comprising: a demountable container adapted for shipment on railway and highway vehicles and for pneumatic discharge of its contents, said container being provided with at least one elongated compartment having oppositely sloping interior side walls which converge downwardly and are spaced apart adjacent the lower edges thereof to form a relatively narrow slot substantially coextensive in length with said compartment, said compartment having at least one suction discharge opening adjacent one end of and spaced somewhat above said slot; an air duct for material-entraining outside air, said duct extending along and beneath the full length of said slot and the adjacent lower edges of said side walls and communicating with said compartment via and throughout the length of said slot, said duct having an inlet for outside air at that end thereof opposite the said one end of said slot; and means in said duct for obstructing the passage of material from within said compartment through said slot and into said duct, whereby when suction is applied to said discharge opening a current of outside air traverses said duct, passes upwardly through said slot throughout its length, and subjects the material within said compartment to an air attack, via the slot, to assist in dislodging the material and entraining the same for pneumatic discharge through said opening.

2. Apparatus for bulk transportation of finely divided solid material such as cereal flour or the like, the combination comprising: a demountable container adapted for shipment on railway and highway vehicles and for pneumatic discharge of its contents, said container being provided with at least one elongated compartment having oppositely sloping interior side walls which converge downwardly and are spaced apart adjacent the lower edges thereof to form a relatively narrow slot substantially coextensive in length with said compartment, said compartment having at least one suction discharge opening adjacent one end of and spaced somewhat above said slot; said sloping side walls comprising relatively large unsupported areas of sheet material secured adjacent the edges thereof to said container; an air duct for material-entraining outside air, said duct extending along and beneath the full length of said slot and the adjacent lower edges of said side walls and communicating with said compartment via and through the length of said slot, said duct having an inlet for outside air at that end thereof opposite the said one end of said slot; means in said duct for obstructing the passage of material from within said compartment through said slot and into said duct; whereby when suction is applied to said discharge opening a current of outside air traverses said duct, passes upwardly through said slot throughout its length, and subjects the material within said compartment to an air attack, via the slot, to assist in dislodging the material and entraining the same for pneumatic discharge through said opening; and means for rapidly and periodically interrupting the flow of outside air into said duct, whereby after the major portion of the compartment contents has been evacuated the resulting pulsations of air pressure within said duct and said compartment will produce vibration of said large side wall areas to assist in dislodging remaining material therefrom for entrainment by said current of outside air.

3. The combination recited in claim 2 in which the means for periodically interrupting the flow of air into the duct is impelled by the air current within and adjacent the entrance thereof into said duct.

4. Apparatus for bulk transportation of finely divided solid material such as cereal flour or the like, the combination comprising: a demountable container adapted for shipment on railway and highway vehicles and for pneumatic discharge of its contents, said container being provided with at least one elongated compartment having oppositely sloping interior side walls which converge downwardly and are spaced apart adjacent the lower edges thereof to form a relatively narrow slot substantially coextensive in length with said compartment, said compartment having at least one suction discharge opening adjacent one end of and spaced somewhat above said slot; an air duct for material-entraining outside air, said duct extending along and beneath the full length of said slot and the adjacent lower edges of said side walls and communicating with said compartment via and throughout the length of said slot; a closure for said slot comprising a rod-like element coextensive in length with said slot and supported therebeneath in said duct; and means operable from outside said compartment for moving said element into and out of slot closing position, whereby when said element is in position to open said slot and suction is applied to said discharge opening a current of outside air traverses said duct, passes upwardly through said slot throughout its length, and subjects the material within said compartment to an air attack, via the slot, to assist in dislodging the material and entraining the same for pneumatic discharge through said opening.

5. The combination recited in claim 4 in which the means for operating the slot closure comprises at least one transversely extending rod member which engages said element and is rotatably operable from without and to one side of the container to raise and lower said element relative to the slot opening.

6. The combination recited in claim 4 in which the means for operating the slot closure comprises two independent cam means each engageable with an opposite end of said element, whereby one of said cam means may be operated to effect movement of one end of said element into slot closing position while the other end thereof remains in slot opening position, thus providing an effective slot width which tapers from one end to the other.

7. The combination recited in claim 4 in which the rod-like closure element is rotatably mounted and is provided along its length with a plurality of spaced offset portions; and supporting means for said element engaging said element at said portions, whereby rotation of said element will effect its raising and lowering into closing and opening relation to said slot.

RAGNAR A. NORBOM.

REFERENCES CITED

The following references are of record in the file of this patent:

UNITED STATES PATENTS

| Number | Name | Date |
|---|---|---|
| 299,270 | Sachs | May 27, 1884 |
| 310,905 | Millbank | Jan. 20, 1885 |
| 528,417 | Duckham | Oct. 30, 1894 |
| 584,021 | Tilghman | June 8, 1897 |
| 603,077 | Day | Apr. 26, 1898 |
| 856,456 | Feehery | June 11, 1907 |
| 925,591 | Pangborn | June 22, 1909 |
| 941,442 | Dornfield | Nov. 30, 1909 |
| 1,241,437 | Pian | Sept. 25, 1917 |
| 1,308,464 | Westly | July 1, 1919 |
| 1,339,977 | Pruden | May 11, 1920 |
| 1,386,009 | McDonald | Aug. 2, 1921 |
| 1,390,974 | Von Porat | Sept. 13, 1921 |
| 1,445,760 | Drake | Feb. 20, 1923 |
| 1,551,080 | Welcker | Aug. 25, 1925 |
| 1,570,795 | Tainton | Jan. 26, 1926 |
| 1,868,298 | Wallo | July 19, 1932 |
| 1,911,514 | Kernan | May 30, 1933 |
| 1,915,757 | Pierce | June 27, 1933 |
| 2,020,628 | Woodruff | Nov. 12, 1935 |
| 2,030,553 | Tiley | Feb. 11, 1936 |
| 2,077,756 | Hurst | Apr. 20, 1937 |
| 2,120,003 | Schanz | June 7, 1938 |
| 2,147,300 | Kennedy | Feb. 14, 1939 |
| 2,165,933 | Martin | July 11, 1939 |
| 2,166,484 | Carlson | July 18, 1939 |
| 2,190,727 | McKenna | Feb. 20, 1940 |
| 2,221,741 | Vogel-Jorgensen | Nov. 12, 1940 |
| 2,258,125 | Robinson | Oct. 7, 1941 |
| 2,264,108 | Anderson | Nov. 25, 1941 |
| 2,328,240 | Wiegand | Aug. 31, 1943 |

FOREIGN PATENTS

| Number | Country | Date |
|---|---|---|
| 384,338 | Germany | Nov. 17, 1923 |
| 596,034 | Germany | Apr. 26, 1934 |
| 439,819 | Great Britain | Dec. 16, 1935 |
| 60,272 | Sweden | Feb. 23, 1926 |